(12) United States Patent
Farkash et al.

(10) Patent No.: US 6,355,371 B1
(45) Date of Patent: Mar. 12, 2002

(54) PROFILED FUEL CELL FLOW PLATE GASKET

(75) Inventors: Ron H. Farkash, Clifton Park; Charles M. Carlstrom, Saratoga Springs; Robert A. Hoyt, Castleton; Dean P. Skrzycke, Latham, all of NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/384,622

(22) Filed: Aug. 27, 1999

(51) Int. Cl.[7] ............................ H01M 2/08; H01M 8/02
(52) U.S. Cl. ........................................................ 429/35
(58) Field of Search ...................................... 429/34–39

(56) References Cited

U.S. PATENT DOCUMENTS

| 4,269,642 A | 5/1981 | Decasperis et al. |
| 4,365,008 A | 12/1982 | Decasperis et al. |
| 4,505,992 A | 3/1985 | Dettling et al. |
| 4,588,661 A | 5/1986 | Kaufman et al. |
| 4,604,331 A | 8/1986 | Louis |
| 4,738,905 A | 4/1988 | Collins |
| 5,176,966 A | 1/1993 | Epp et al. |
| 5,230,966 A | 7/1993 | Voss et al. |
| 5,284,718 A | 2/1994 | Chow et al. |
| 5,441,621 A | 8/1995 | Molter et al. |
| 5,464,700 A | 11/1995 | Steck et al. |
| 5,789,094 A | 8/1998 | Kusunoki et al. |
| 5,928,807 A | 7/1999 | Elias |
| 6,057,054 A | * 5/2000 | Barton et al. |

FOREIGN PATENT DOCUMENTS

WO    WO 00/54352    * 9/2000

* cited by examiner

Primary Examiner—Gabrielle Brouillette
Assistant Examiner—Susy Tsang
(74) Attorney, Agent, or Firm—Trop, Pruner & Hu, P.C.

(57) ABSTRACT

A flow plate gasket that is usable with a first fuel cell plate and a second fuel cell plate includes a material that is adapted to form a seal between the first and second fuel cell plates. The material includes at least two spaced ridges to contact the first fuel cell plate when the gasket is compressed between the first and second fuel cell plates.

27 Claims, 5 Drawing Sheets

PROFILED FUEL CELL FLOW PLATE GASKET

BACKGROUND

The invention relates to a profiled fuel cell flow plate gasket.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

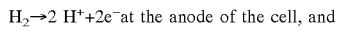

$H_2 \rightarrow 2\ H^+ + 2e^-$ at the anode of the cell, and

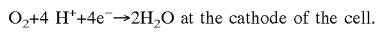

$O_2 + 4\ H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different flow plates that are stacked one on top of the other in the appropriate order, and each plate may be associated with more than one fuel cell of the stack. The plates may be made from a graphite composite or metal material and may include various flow channels and orifices to, as examples, route the above-described reactants and products through the fuel cell stack. Several PEMs (each one being associated with a particular fuel cell) may be dispersed throughout the stack between the anodes and cathodes of the different fuel cells. The anode and the cathode may each be made out of an electrically conductive gas diffusion material, such as a carbon cloth or paper material, for example.

Referring to FIG. 1, as an example, a fuel cell stack 10 may be formed out of repeating units called plate modules 12. In this manner, each plate module 12 includes a set of composite plates that may form several fuel cells. For example, for the arrangement depicted in FIG. 1, an exemplary plate module 12a may be formed from a cathode cooler plate 14, a bipolar plate 16, an anode cooler plate 18, a cathode cooler plate 20, a bipolar plate 22 and an anode cooler plate 24 that are stacked from bottom to top in the listed order. The cooler plate functions as a heat exchanger by communicating a coolant through flow channels in either the upper or lower surface of the cooler plate to remove heat from the stack 10. The surface of the cooler plate that is not used to communicate the coolant includes flow channels to communicate either hydrogen (for the anode cooler plates 18 and 24) or oxygen (for the cathode cooler plates 14 and 20) to an associated fuel cell. The bipolar plates 16 and 22 include flow channels on one surface to communicate hydrogen to the membrane of an associated fuel cell and flow channels on the opposing surface to communicate oxygen to the membrane of another associated fuel cell. Due to this arrangement, each fuel cell may be formed in part from one bipolar plate and one cooler plate, as an example.

For example, one fuel cell of the plate module 12a may include an anode-membrane-cathode sandwich, called a membrane-electrode-assembly (MEA), that is located between the anode cooler plate 24 and the bipolar plate 22. In this manner, the upper surface of the bipolar plate 22 includes flow channels to route oxygen near the cathode of the MEA, and the lower surface of the anode cooler plate 24 includes flow channels to route hydrogen near the anode of the MEA.

As another example, another fuel cell of the plate module 12a may be formed from another MEA that is located between the bipolar plate 22 and the cathode cooler plate 20. The lower surface of the bipolar plate 22 includes flow channels to route hydrogen near the anode of the MEA, and the upper surface of the cathode cooler plate 24 includes flow channels to route oxygen near the cathode of the MEA. The other fuel cells of the plate module 12a may be formed in a similar manner.

To communicate the hydrogen, oxygen and coolant throughout the stack, each plate includes several openings that align with corresponding openings in the other plates to form passageways of a manifold. The fuel cell stack typically includes flow plate gaskets that reside between the plates to seal off the various manifold passageways and flow channels. For example, such a flow plate gasket may be located between the anode cooler 24 and the bipolar plate 22 and reside in a gasket groove of the bipolar plate 22, for example. The flow plate gasket may be an O-ring gasket that has a disk-shaped cross-section when uncompressed.

The seals that are provided by the flow plate gaskets may govern the lifetime of the fuel cell stack. For example, a coolant may be used that is incompatible with the membrane and thus, may damage the membrane on contact. Therefore, if a particular flow plate gasket is not compatible with the coolant, the coolant may permit the coolant to enter one of the reactant manifold passageways and contact the membrane, an event that may cause the corresponding fuel cell to fail. Unfortunately, the failure of a fuel cell may prompt a shut down of the entire fuel cell stack until repairs may be made.

Thus, there is a continuing need for fuel cell flow plate gaskets that have improved sealing capabilities.

SUMMARY

In one embodiment of the invention, a flow plate gasket that is usable with a first fuel cell plate and a second fuel cell plate includes a material that is adapted to form a seal between the first and second fuel cell plates. The material includes at least two spaced ridges to contact the first fuel cell plate when the gasket is compressed between the first and second fuel cell plates.

In another embodiment of the invention, an assembly includes a first fuel cell plate, a second fuel cell plate and a gasket. The gasket is adapted to form a seal between the first and second fuel cell plates. The gasket includes at least two spaced ridges to contact the first fuel cell plate when the gasket is compressed between the first and second fuel cell plates. In general, advantageous features of embodiments of the present invention may include: seals having higher void volume for improved compression than traditional o-ring seals that are placed in rectangular grooves; seals having an increased number of sealing surfaces than o-ring configurations; seals that can more accurately and reliably be placed into position during fuel cell stack assembly; and seals that provide less movement during compression, such as the twisting and other movement of o-rings that may occur during compression.

Advantages and other features of the invention will become apparent from the following description, from the drawing and from the claims.

DETAILED DESCRIPTION

Figure 1:
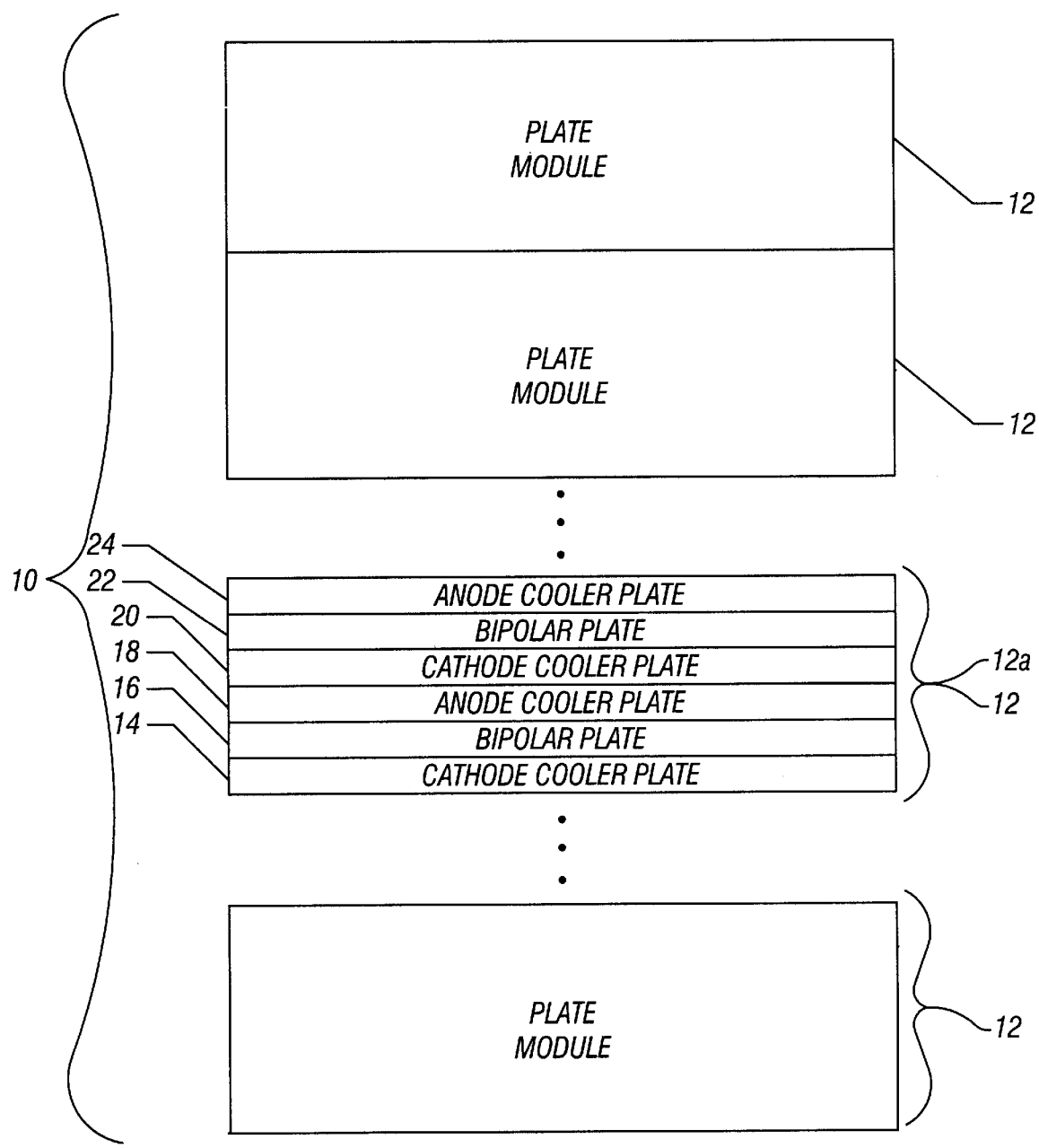
FIG. 1 is a schematic diagram illustrating a fuel cell stack according to the prior art.
Figure 2:
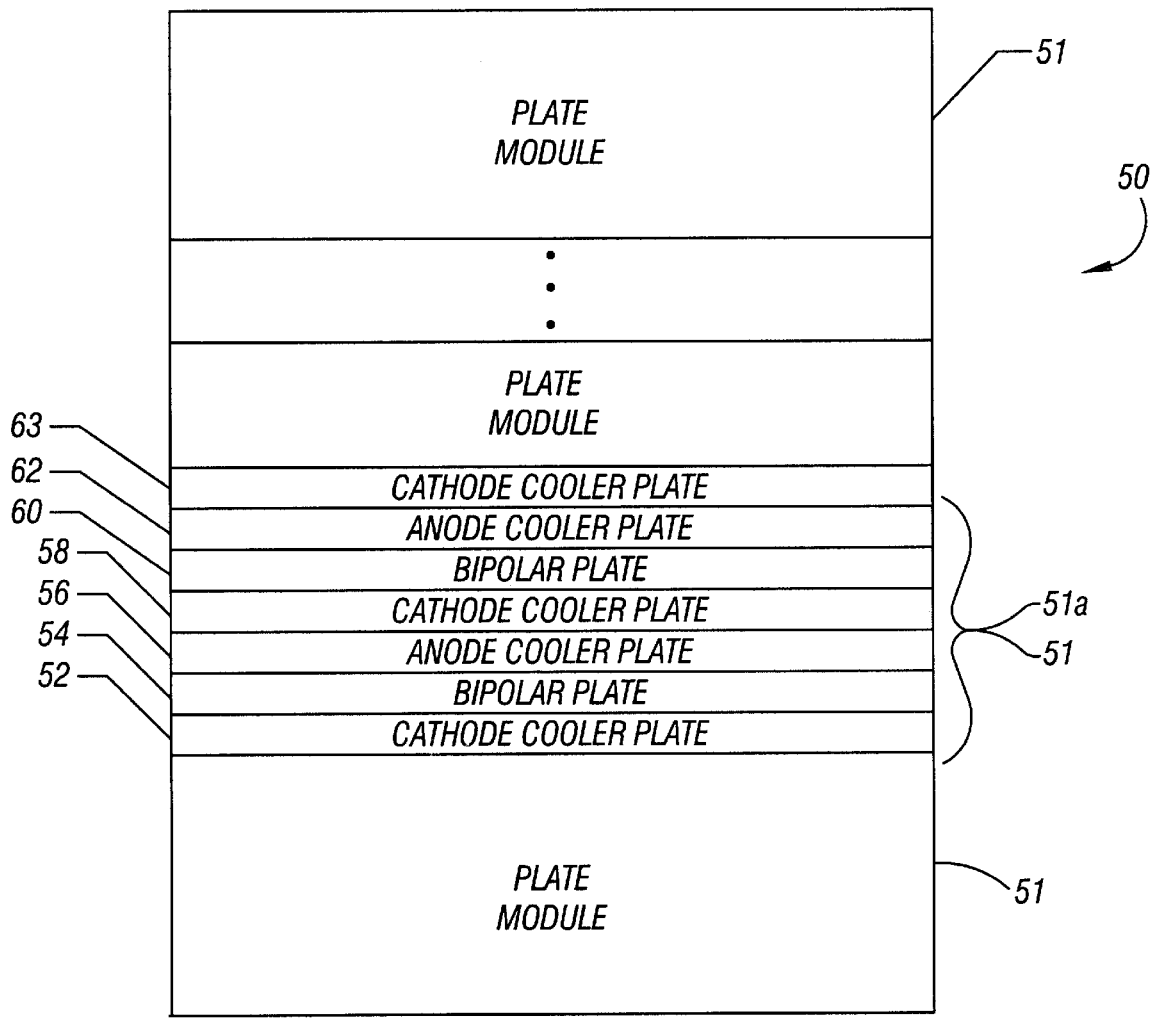
FIG. 2 is a side view of a fuel cell stack according to an embodiment of the invention.

Referring to FIG. 2, an embodiment 50 of a fuel cell stack in accordance with the invention includes flow plate gaskets that include profiled features to seal off the various manifold passageway openings and flow channels that are established by flow plates of the stack 50.

More specifically, the fuel cell stack 50 may be formed from repeating units called plate modules 51. An exemplary plate module 51a (having a design similar to the other plate modules 51) is depicted in FIG. 2. As shown, the plate module 51a includes flow plates (graphite composite or metal plates, for example) that include flow channels to communicate reactants and coolants to fuel cells of the stack 50. As an example, the plate module 51 a may include the following flow plates: bipolar plates 54 and 60; cathode cooler plates 52 and 58; and anode cooler plates 56 and 62.

Figure 3A:
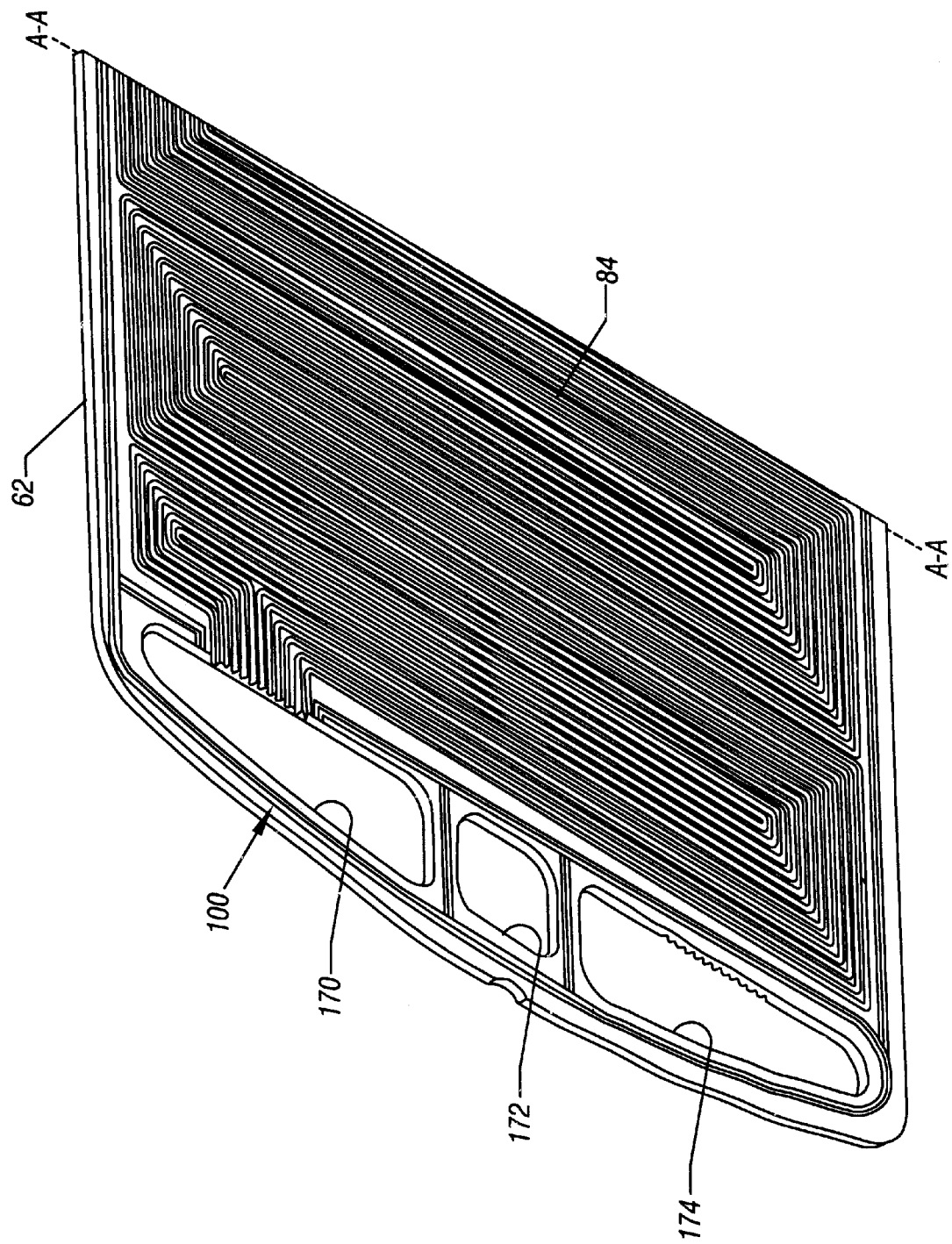
FIGS. 3A and 3B illustrate two halves of a bottom perspective view of an anode cooler plate and a gasket that forms a seal against the anode cooler plate according to an embodiment of the invention.
Figure 3B:
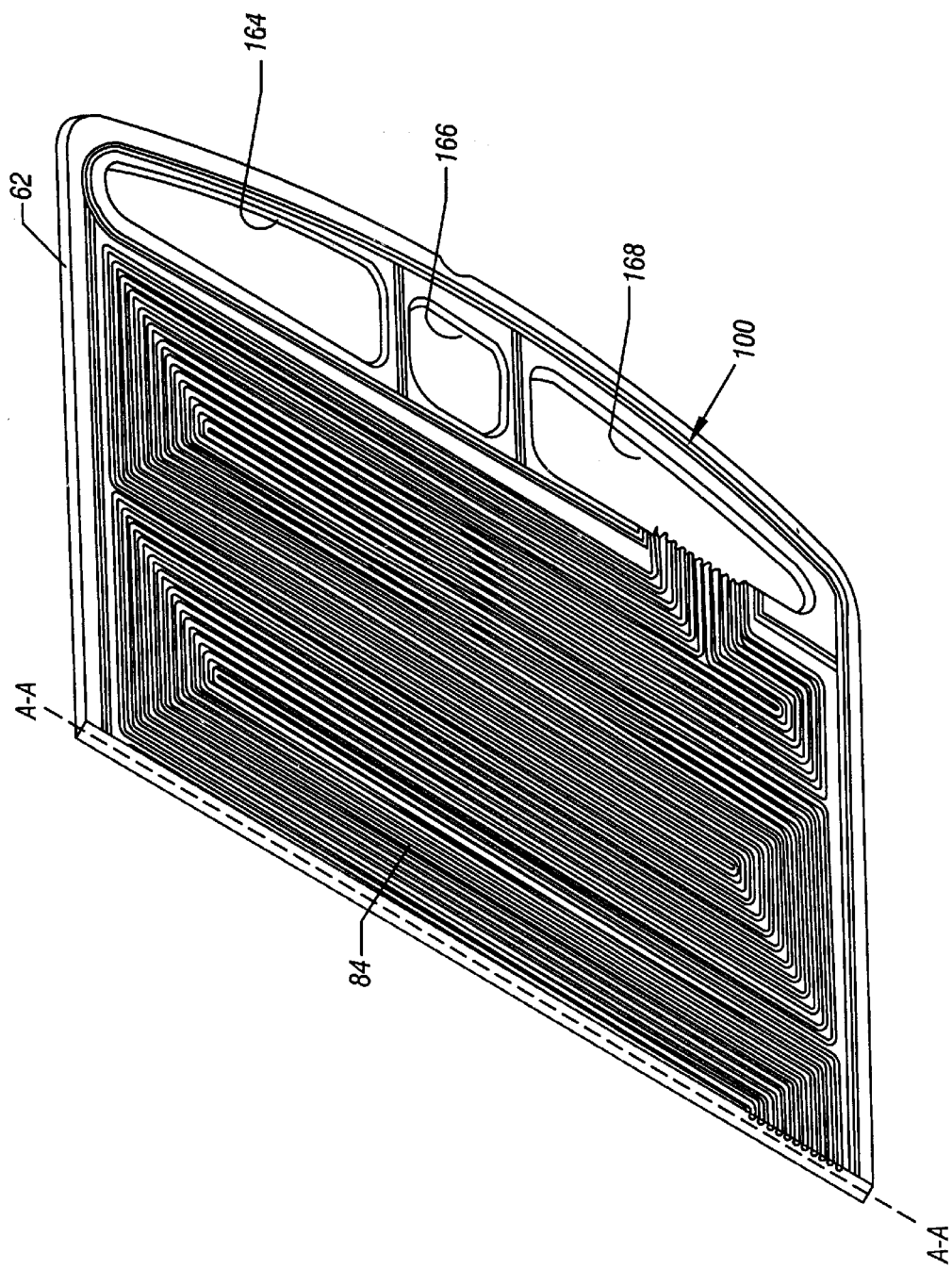

FIGS. 3A and 3B illustrate a bottom up perspective view of the anode cooler plate 62 that is joined in FIGS. 3A and 3B at line A—A. Similar to the other flow plates, the anode cooler plate 62 includes openings that form a manifold for communicating reactants (oxygen and hydrogen) for the fuel cells and a coolant (Therminol D-12 made by Solutia Inc., for example) to and from the various surface flow channels of the plates. In this manner, the anode cooler plate 62 may include an opening 170 (see FIG. 3A) to form part of a vertical inlet passageway of the manifold for delivering hydrogen to the fuel cells. The anode cooler plate 62 may also include an opening 168 (see FIG. 3B) to form part of a vertical outlet passageway of the manifold for removing unconsumed hydrogen from the stack 50. Similarly, openings 174 (see FIG. 3A) and 164 (see FIG. 3B) of the anode cooler plate 62 may form partial vertical inlet and outlet passageways, respectively, of the manifold for communicating an air flow (that furnishes oxygen) to the fuel cells; and openings 172 (see FIG. 3A) and 166 (see FIG. 3B) in the anode cooler plate 62 may form part of vertical inlet and outlet passageways, respectively, of the manifold for communicating the coolant.

As an example of the fluid flows through the plate module 51a, the anode cooler plate 62 may include horizontal flow channels (not shown) on its upper surface through which the coolant flows to remove heat from the stack 50. For purposes of communicating hydrogen to an associated membrane (a proton exchange membrane (PEM), for example), the lower surface of the anode cooler plate 62 includes horizontal surface flow channels 84 (see FIGS. 3A and 3B). In this manner, the hydrogen may flow in a serpentine path through the flow channels 84 between the openings 170 and 168. While flowing through the flow channels 84, some of the hydrogen diffuses through a gas diffusion layer (located between the anode cooler plate 62 and the lower adjacent bipolar plate 60) and reaches the membrane of the associated fuel cell. Thus, coolant flows through the upper surface flow channels of the anode cooler plate 62, and hydrogen flows through the lower surface flow channels 84 of the anode cooler plate 62.

Figure 4:
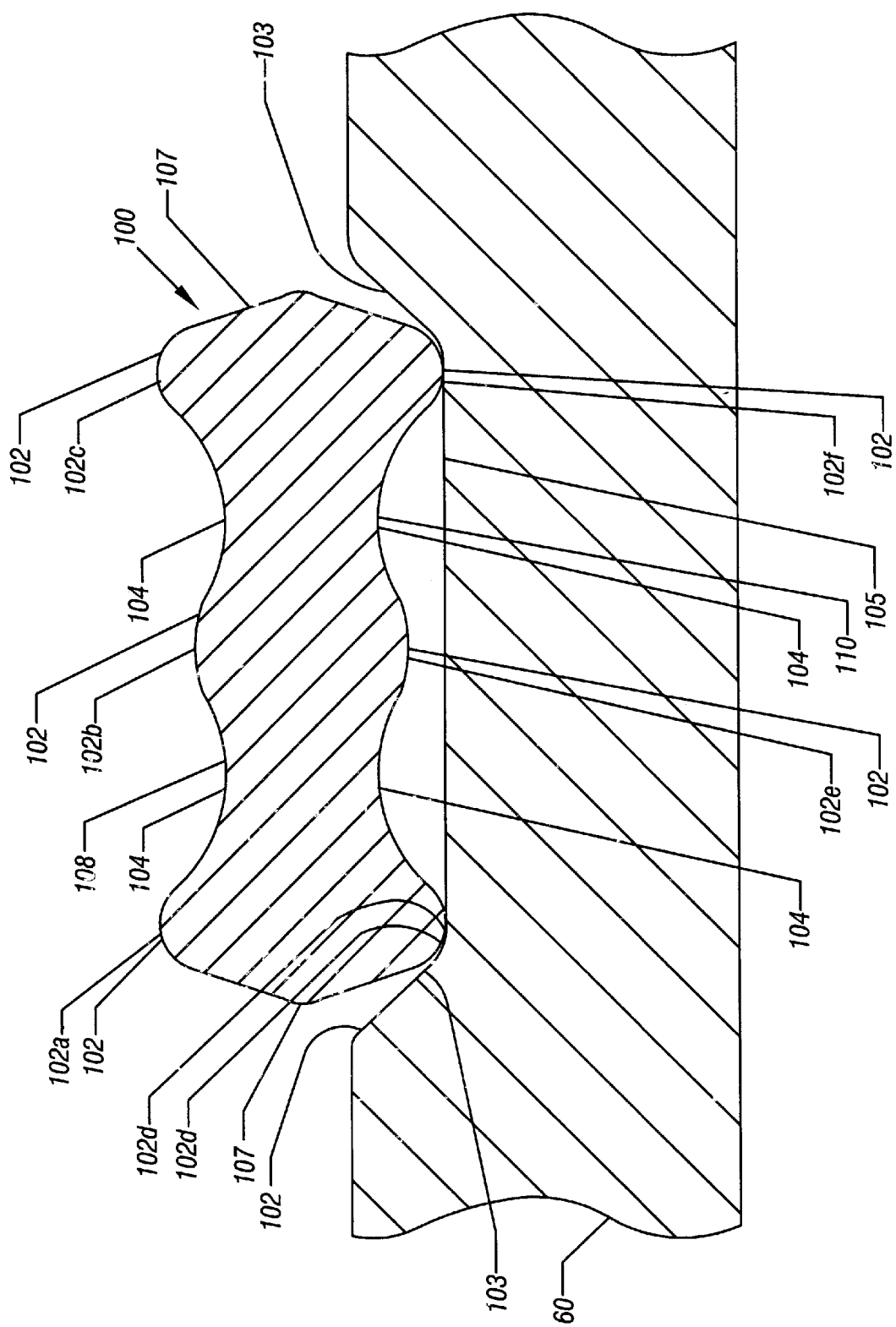
FIG. 4 is a cross-sectional of a bipolar plate and a flow plate gasket according to an embodiment of the invention.

For purposes of sealing the various flow channels and manifold passageways, the fuel cell stack 50 (and plate module 51a) includes flow plate gaskets, such as a flow plate gasket 100 (shown in relation to the anode cooler plate 62 in FIGS. 3A and 3B) that resides in a gasket groove 112 of the bipolar plate 60 (see FIGS. 2 and 4). In this manner, when the flow plates of the stack 50 are compressed, the flow plate gasket 100 forms a seal between the anode cooler plate 62 and the bipolar plate 60. This seal, in turn, seals off regions (between the plates 60 and 62) that are associated with the coolant and reactant flows.

A cross-sectional view of the flow plate gasket 100 in a gasket groove 102 of the bipolar plate 60 is depicted in FIG. 4. As described below, in some embodiments, the profiled features of the gasket 100 may cause the gasket 100 to outperform conventional O-ring gaskets.

In particular, the gasket 100 may include spaced ridges 102 (ridges 102a, 102b, 102c, 102d, 102e and 102f) that form sealing surfaces for sealing the gasket 100 between the anode cooler plate 62 and the bipolar plate 60. In this manner, the ridges 102a, 102b and 102c are formed on an upper surface 108 of the flow plate gasket 100 and are designed to form sealing surfaces between the gasket 100 and the lower surface of the anode cooler plate 62. In some embodiments, the ridges 102a, 102b and 102c may be uniformly spaced apart.

In some embodiments, when the gasket 100 is uncompressed, the ridge 102b in the middle is shorter than the other two outer ridges 102a and 102c. In this manner, when the plates of the fuel cell stack 50 are compressed, the gasket 100 is compressed so that the middle ridge 102b seals against the anode cooler plate 62. Due to this design, the middle ridge 102b is less deformed and the ridges 102a and 102c are more deformed when the flow plate gasket 100 is compressed.

Similar to the ridges 102a, 102b and 102c, ridges 102d, 102e and 102f may also be formed on a lower surface 110 of the flow plate gasket 100. In this manner, the ridges 102d, 102e and 102f form sealing surfaces for sealing the flow plate gasket 100 to the upper surface of the bipolar plate 60 (i.e., for sealing the flow plate gasket 100 to a bottom surface 103 of the gasket groove 102). In some embodiments, the ridges 102d, 102e and 102f may be uniformly spaced apart, and the middle ridge 102e may be shorter than the outer edges 102d and 102f when the flow plate gasket 100 is uncompressed.

In some embodiments, channels 104 may separate the ridges 102. In this manner, each ridge 102 may be generally concave to the associated flow plate (to which the ridge 102 seals), and each channel 104 (that spaces a particular ridge 102 from an adjacent ridge 102) may be generally convex with respect to the associated flow plate surface. The channel 104, in some embodiments, may have a generally arcuate cross-section, and in some embodiments, the ridge 102 may have a generally arcuate cross-section.

Among the other features of the gasket 100, the sides of the gasket 100 may form generally outwardly bowed edges 107 when the gasket 100 is uncompressed. Therefore, when the gasket 100 is compressed, the bowed edges 107 laterally expand to seal against side walls 103 of the gasket groove 102.

Profiled flow plate gaskets, such as the flow plate gasket 100, may be used between other flow plates of the stack 50.

As a more specific example, in some embodiments, the gasket 100 may be made out of an elastomer, such as a silicone, flourosilicone, viton, or nitrile material, as just a few examples. In some embodiments, each ridge 102 may have a radius of curvature between approximately 0.005 inches (in.) to 0.010 in., such as approximately 0.08 in., for example. In some embodiments, the channel 104 may have a generally arcuate cross-section that may have a radius of curvature between approximately 0.020 in. to 0.025 in., such as approximately 0.023 in., for example. The bowed edge 107, in some embodiments, may have a radius of curvature between approximately 0.02 in. to 0.04 in., such as approximately 0.03 in., for example. In some embodiments, the uncompressed thickness of the gasket 100 may be between approximately 0.03 in. to 0.10 in., such as approximately 0.06 in., for example.

In the preceding description, directional terms, such as "upper," "lower,""vertical,""horizontal," etc. may have been used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by approximately 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An assembly comprising:
    a first fuel cell plate;
    a second fuel cell plate; and
    a gasket adapted to form a seal between the first and second fuel cell plates, the gasket including at least two spaced ridges to contact the first fuel cell plate when the gasket is compressed between the first and second fuel cell plates,
    wherein one of said at least two spaced ridges contact the first fuel cell plate when the gasket is uncompressed and another one of said at least two spaced ridges does not contact the first fuel cell plate when the gasket is uncompressed.

2. The assembly of claim 1, wherein a radius of curvature of at least one of the ridges is approximately between 0.005 inches and 0.010 inches.

3. The assembly of claim 1, wherein the gasket further comprises:
    channels between said at least two spaced ridges and substantially parallel to said at least two spaced ridges.

4. The assembly of claim 3, wherein at least one of the channels has a generally curved cross-section.

5. The assembly of claim 4, wherein the cross-section comprises an arcuate cross-section.

6. The assembly of claim 5, wherein the radius of curvature of the cross-section is approximately between 0.020 inches and 0.025 inches.

7. The assembly of claim 1, wherein a gasket groove is formed in one of the first and second plates and the gasket at least partially resides in the gasket groove.

8. The assembly of claim 1, wherein the gasket includes at least one outwardly bowed edge adapted to expand between the first and second plates when compressed.

9. The assembly of claim 8, wherein the bowed edge has a radius of curvature approximately between 0.02 inches and 0.04 inches.

10. An assembly comprising:
    a first fuel cell plate;
    a second fuel cell plate; and
    a gasket adapted to form a seal between the first and second fuel cell plates, the gasket including at least three spaced ridges to contact the first fuel cell plate when the gasket is compressed between the first and second fuel cell plates,
    wherein two of said at least three spaced ridges contact the first fuel cell plate when the gasket is uncompressed and another one of said at least three spaced ridges does not contact the first fuel cell plate when the gasket is uncompressed.

11. The assembly of claim 10, wherein said another one of said at least three spaced ridges is located between said two of said at least three spaced ridges.

12. The assembly of claim 10, wherein the gasket further comprises:
    channels between said at least three spaced ridges and substantially parallel to said at least three spaced ridges.

13. The assembly of claim 12, wherein at least one of the channels has a generally curved cross-section.

14. The assembly of claim 13, wherein the cross-section comprises an arcuate cross-section.

15. The assembly of claim 14, wherein the radius of curvature of cross-section is approximately between 0.020 inches and 0.025 inches.

16. The assembly of claim 10, wherein a gasket groove is formed in one of the first and second plates and the gasket resides in the gasket groove.

17. The assembly of claim 10, wherein a radius of curvature of at least one of the ridges is approximately between 0.005 inches and 0.010 inches.

18. The assembly of claim 10, wherein the gasket includes at least one bowed edge adapted to expand between the first and second plates when compressed.

19. The assembly of claim 18, wherein the bowed edge has a radius of curvature approximately between 0.02 inches and 0.04 inches.

20. The assembly of claim 10, wherein the gasket further includes at least three additional spaced ridges to contact the second fuel cell plate when the gasket is compressed between the first and second fuel cell plates.

21. The assembly of claim 20, wherein two of said at least three additional spaced ridges contact the second fuel cell plate when the gasket is uncompressed and another one of said at least three additional spaced ridges does not contact the second fuel cell plate when the gasket is uncompressed.

22. The assembly of claim 21, wherein said another one of said at least three additional spaced ridges is located between said two of said at least three additional spaced ridges.

23. The assembly of claim 20, wherein the gasket further comprises:
    channels located between said at least three additional spaced ridges and parallel to said at least three additional spaced ridges.

24. A method for use with a first fuel cell plate and a second fuel cell plate, comprising:
    forming a seal between the first and second fuel cell plates using a gasket;

compressing the gasket between the first and second fuel cell plates to cause at least three spaced ridges of the gasket to contact the first fuel cell plate; and before compressing the gasket, contacting the first fuel cell plate with two of said at least three spaced ridges and preventing another one of said at least three spaced ridges from contacting the first fuel cell plate.

25. The method of claim 24, wherein said another one of said at least three spaced ridges is located between said two of said at least three spaced ridges.

26. The method of claim 24, further comprising:

establishing channels between said at least three spaced ridges, the channels being substantially parallel to said at least three spaced ridges.

27. The method of claim 24, wherein the compressing further causes at least three additional spaced ridges of the gasket to contact the second fuel cell plate.

* * * * *